United States Patent [19]

Craigie

[11] 4,033,226
[45] July 5, 1977

[54] CARTRIDGE HOLDERS

[75] Inventor: Samuel W. Craigie, Slough, England

[73] Assignee: M. L. Aviation Company Limited, Slough, England

[22] Filed: Apr. 26, 1976

[21] Appl. No.: 680,225

[30] Foreign Application Priority Data

Dec. 30, 1975 United Kingdom ............. 53136/75

[52] U.S. Cl. .................................. 89/1.5 F; 89/1 B
[51] Int. Cl.² .......................................... F42B 3/00
[58] Field of Search ................. 89/1.5 F, 1 B, 1 D, 89/1 R, 1 C; 244/137 R; 294/83 AE

[56] References Cited

UNITED STATES PATENTS

| 2,005,913 | 6/1935 | Coffman | 89/1 D UX |
| 3,266,834 | 8/1966 | Lebovitz | 244/137 R X |
| 3,557,550 | 1/1971 | Legarra | 89/1.5 F X |

FOREIGN PATENTS OR APPLICATIONS 295,784  3/1928  United Kingdom .............. 89/1.5 F Primary Examiner—David H. Brown
Attorney, Agent, or Firm—Larson, Taylor and Hinds

[57] ABSTRACT

A cartridge holder for fitting into the breech of an ejection release unit comprises a generally cup-shaped body formed of two parts, one of which forms the base of the cup and the other of which forms a continuous cylindrical wall for the cup which fits into the base part. The base part has an external screw thread for engagement with the screw thread in the breech opening and the engaging surfaces of the two parts are shaped in relation to one another so as to define passages extending between the interior of the base part and the exterior above the screw thread, this preferably being achieved by forming the outer surface of the cylindrical part with a number of spaced longitudinal lands extending over the length of the surface engagement cooperating with a smooth and cylindrical inner surface on the base part.

7 Claims, 2 Drawing Figures

CARTRIDGE HOLDERS

This invention relates to ejection release units for releasing and projecting stores such as bombs and similar heavy objects from aircraft. Examples of such units are described in British Patent specifications Nos. 1,058,997 and 1,248,926 and comprise basically a releasable latching mechanism for holding the store and eventually releasing it and a pair of ejection guns for projecting the store from the aircraft. Both of these mechanisms are operated by high pressure gas from explosive cartridges and, in practice, two such cartridges are always fitted so as to overcome the risk of one cartridge misfiring.

Each cartridge is normally fitted in a generally cup-shaped holder with the rim of the cap of the cartridge projecting beyond the sides of the cup at the open end. The holder together with the enclosed cartridge is fitted into a breech in the ejector unit, the base of the cup being formed with an external screw thread which screws into a complementary screw thread in the breech opening. The breech defines an annular chamber surrounding the cartridge within its holder and the cylindrical walls of the holder are formed with a number of circular openings so that when the cartridge is fired, the thin casing of the cartridge burst through these openings thus allowing the gas generated to flow into the annular chamber.

The two breeches in which the cartridge holders are fitted are arranged side by side with a communicating passage between the respective annular chambers so that if one cartridge fails, its role is automatically taken over by the remaining cartridge. Gas passages run from the two annular chambers to operate the mechanisms making up the complete unit and when a cartridge is fired and bursts outwardly through the openings into the annular chamber in the breech, small particles of the thin metal forming the casing of the cartridge are liable to become detached and to be carried along with particles of the explosive in the gas stream. After the unit has been fired several times, there may be a relatively large accumulation of such particles which may tend to block the various passages. Not only does this necessitate relatively frequent cleaning of the various components of the unit, which is a difficult and time-consuming operation, but it also leads to the risk that in any particular operation a relatively large piece of metal may at least partially block one of the passages and thus prevent the correct operation of the unit.

According to the present invention, a cartridge holder comprises a generally cup-shaped body formed of two parts, one of which forms the base of the cup and has an external screw thread for engagement with the screw thread in the breech opening and the other of which forms a continuous cylindrical wall for the cup which fits into the base part, the engaging surfaces of the two parts being shaped in relation to one another so as to define passages extending between the interior of the base part and the exterior above the screw thread.

When such a cartridge holder is fitted in its operative position in a breech and contains a cartridge of such a length as to leave a space at the bottom of the cup when the cap of the cartridge is located against the rim of the cup, ignition of the cartridge causes it to burst at its lower end rather than at the sides, thus allowing gas to flow into the space at the bottom of the cup. This gas then flows through the passages extending between the interior of the base of the cup and the exterior above the screw thread and hence into the annular chamber in the breech in the same way as if the cartridge had burst at the sides.

Bursting of the cartridge at its end avoids the production of metal particles and by making the passages between the two parts of the holder sufficiently narrow, they can exert a filtering action which prevents the passage of all but the smallest of the non-metallic particles arising from the firing of the cartridge. There will be an inevitable deposition of small particles in the passages themselves, but when these passages need cleaning, the two parts of the holder can be separated so as to expose the surfaces of the passages for cleaning purposes, e.g. by means of a wire brush.

Once the two parts of the holder are separated, the passages are transformed into slots or grooves in one surface or the other, or both, and the cleaning is then an extremely simple matter.

The passages are most conveniently defined by forming the outer surface of the cylindrical part with a number of spaced longitudinal lands extending over the length of the surface engagement so as between them to form longitudinal grooves. The inner surface of the base part can then be smooth and cylindrical so that the cleaning of this part is made even easier.

Since there are no forces tending to separate the two parts of the holder during operation, the cylindrical part may be a simple push fit within the base part so that they can be separated without difficulty when cleaning is required. The greater facility of cleaning ensures a longer life to the complete assembly, but since the cylindrical part will experience somewhat more wear than the base part in that it is of a generally thinner section and more liable to errosion damage, this part can be replaced, if required, independently of the base part.

A construction of a cartridge holder in accordance with the invention will not be described in more detail, by way of example, with reference to the accompanying drawings, in which.

Figure 1:
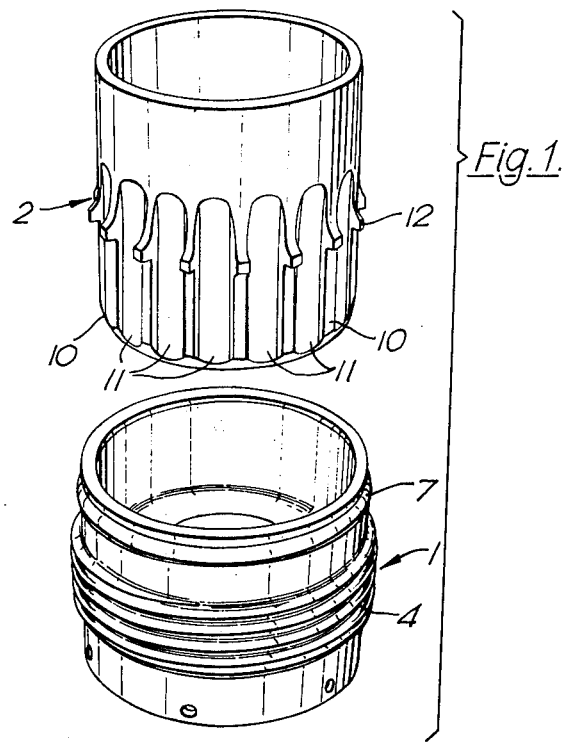
FIG. 1 is an exploded perspective view of the cartridge holder.
Figure 2:
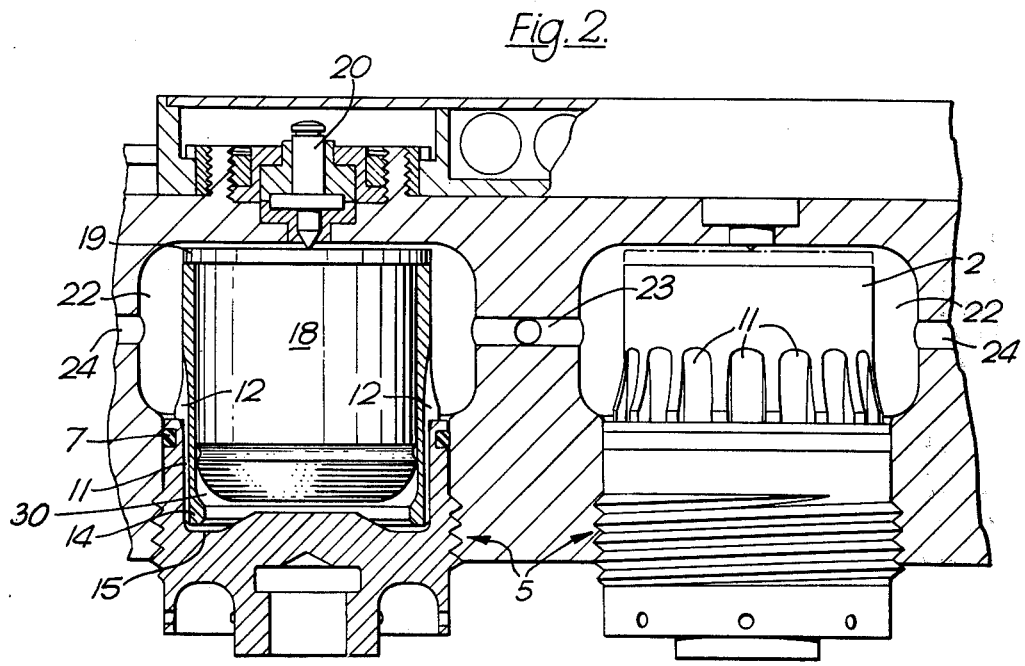
FIG. 2 is a view partly in section of part of an ejection release unit showing two breeches fitted with cartridge holders.

Turning first to FIG. 1, the cartridge holder itself comprises two separate parts 1 and 2 which together form a generally cup-shaped assembly as seen in FIG. 2. The part 1 forms the base of the cup and has an external screw thread 4 for engagement with a complementary screw thread in the breech opening, indicated at 5 in FIG. 2. Above the screw thread 4 is an O-ring 7 located in a corresponding groove which forms a seal with the wall of the breech as seen in FIG. 2. The part 2 constitutes the cylindrical wall of the cup and is formed with a series of spaced longitudinal lands 10 which between them define spaced longitudinal grooves 11. Each land 10 is formed with a projecting portion 12 which, in the assembled position seats against the upper edge of the part 1, as seen in FIG. 2, and thus locates the part 2 in relation to the part 1. When assembled, the grooves 11 form longitudinal passages extending between the interior of the base part 1 and the exterior above the screw thread 4.

The details of the assembly are best seen from the left hand cartridge holder shown in FIG. 2, which is in section. This shows the projecting portions 12 seated against the upper rim of the part 1 so that the lower edge 14 of the part 2 is spaced slightly above the bottom 15 of the interior of the part 1. A cartridge 18 is shown in position in the holder with its cap 19 seated against the upper rim of the part 2. The cartridge is of such a length as to leave a small space 30 between the bottom of the cartridge and the bottom 15 of the part 1. Details of the firing circuit are not illustrated, but a firing pin 20 is shown in contact with the cap 19 of the cartridge.

The cylindrical part 2 is continuous, that is to say it has no openings in the same way as previous constructions of cartridge holder so that, when the cartridge is fired, it bursts at its lower end and gas under pressure passes into the space between the bottom of the cartridge and the bottom of the the part 1 from where it flows upwardly along passage defined between the grooves 11 and the inner wall of the part 1. These passages lead to an annular chamber 22 in each breech, these two chambers being inter-connected by means of a passage 23 and communicating with further passages 24 leading to ejection guns (not shown).

Owing to the fact that the cartridge 18 bursts at its end, no metal particles are produced and any large particles of explosive are filtered out by the narrow passages formed by the grooves 11. As a consequence, only minute particles pass along the passages 24 and contamination is reduced accordingly. The grooves 11 require periodic cleaning, but this is relatively simple since when the two parts of the holder are separated as shown in FIG. 1, the surfaces of the grooves 11 are exposed and may be readily cleaned, for example by means of a wire brush. The two parts are a push fit so that the part 2 may readily be removed from the part 1 for cleaning purposes.

In a specific example in accordance with the invention the cylindrical part of the holder is formed with sixteen lands, each of width 0.050 inches (1.27 mm) and radial thickness 0.020 inches (0.5080 mm) and at a spacing in a circumferential direction of 0.24 inches (0.6096 mm). This provides an equivalent number of longitudinal passages each measuring 0.19 inches (4.826 mm) by 0.020 inches (0.5080 mm).

I claim:

1. A cartridge holder for fitting into the breech opening of an ejection release unit, said holder comprising:
    a base part having a bottom portion and a cylindrical wall portion extending therefrom to form with the bottom portion a cup shape,
    a wall part formed as a continuous cylinder with one end thereof fitting into the cylindrical wall portion of the base part while the remote end of the wall part extends beyond the outer end of the wall portion to form an extension of the cup shape of the base part,
    said wall part including means for holding a cartridge from said remote end thereof inwardly less than the full way to the said bottom portion of the base part to thereby provide a space between the cartridge and the said bottom portion of the base part,
    limiting means for limiting and defining full insertion of the wall part within the base part,
    means for providing a gas flow path from said space within the wall part to a location between the wall part and the wall portion of the base part upon full insertion of the wall part within the base part,
    and further means for defining the engagement of the wall part within the base part to provide a further gas flow path communicating with the first gas flow path and extending along between the outer side of the wall part and the inner side of the said wall portion, and continuing to the exterior of the base part,
    and connecting means on the outside of the base member for engaging the said breech opening to secure the cartridge holder in the ejection release unit.

2. A cartridge holder according to claim 1, said further means comprising raised lands spaced apart circumferentially about the outer surface of the wall part and a continuous cylindrical surface on the interior of the wall portion at a diameter to engage the outer surface of the land such that the spaces between the lands form said further gas flow path.

3. A cartridge holder according to claim 1 said limiting means comprising projecting portions extending outwardly from the outer surface of the wall part and engaging the outer end of the wall portion upon full insertion of the wall part into the base part, and said first gas flow path being around said one end of the wall part between it and the bottom portion of the base part.

4. A cartridge holder according to claim 3, said further means comprising raised lands spaced apart circumferentially about the outer surface of the wall part and aligned longitudinally with the projecting portions and extending out from the wall part, and a continuous cylindrical surface on the interior of the wall portion at a diameter at which said continuous cylindrical surface engages the outer surface of the said lands, such that the spaces between the lands form said further gas flow path.

5. A cartridge holder according to claim 1, said connecting means comprising screw threads on the exterior of the base part positioned to cooperate with threaded surfaces within the breech opening.

6. A cartridge holder according to claim 5, said screw threads terminating at a point spaced inwardly from the outer end of the said wall portion of the base part.

7. A cartridge holder according to claim 6, at least a portion of said screw threads being located at a level along the base part located directly radially outwardly from the said bottom portion of the base part.

* * * * *